United States Patent [19]

Burns

[11] 3,734,708
[45] May 22, 1973

[54] METHOD FOR MAKING AMMONIUM PHOSPHATE FERTILIZER

[75] Inventor: Tom V. Burns, St. Rose, La.

[73] Assignee: Amex Phosphates, Inc., Houston, Tex.

[22] Filed: Feb. 24, 1971

[21] Appl. No.: 118,299

[52] U.S. Cl. .......................... 71/34, 71/43, 423/310, 423/313, 423/315
[51] Int. Cl. ............................................... G05b 7/00
[58] Field of Search ...................... 71/34, 43; 23/107, 23/252; 423/310, 313, 315

[56] References Cited

UNITED STATES PATENTS

| | | | |
|---|---|---|---|
| 3,503,706 | 3/1970 | Legal | 71/34 X |
| 3,492,087 | 1/1970 | MacGregor et al. | 71/43 X |
| 3,464,808 | 9/1969 | Kearns | 71/34 |
| 2,420,544 | 5/1947 | Jones | 23/252 R |
| 3,382,059 | 5/1968 | Getsinger | 71/43 X |
| 3,482,945 | 12/1969 | Legal | 71/43 X |
| 3,397,036 | 8/1968 | Narins et al. | 71/43 X |
| 3,238,021 | 3/1966 | Webber et al. | 71/43 X |
| 3,125,420 | 3/1964 | Coon et al. | 23/107 |
| 3,153,578 | 10/1964 | Taylor | 23/107 |
| 3,539,327 | 11/1970 | Hudson | 71/34 |

Primary Examiner—Samih N. Zaharna
Assistant Examiner—Richard Barnes
Attorney—Larson, Taylor and Hinds

[57] ABSTRACT

Methods and apparatus for reacting ammonia and phosphoric acid in a high temperature vaporous reaction. The apparatus includes a tee mixer wherein hot ammonia is used to heat and atomize phosphoric acid, and a loop reactor wherein the mixed reactants are retained for from 0.10 to 0.18 seconds after which the reaction product is immediately quenched. The apparatus also includes materials handling devices for controlling reactant flows and reaction conditions whereby high analysis polyphosphate fertilizers are produced in dry or liquid form.

8 Claims, 2 Drawing Figures

Patented May 22, 1973

INVENTOR
TOM V. BURNS

BY  Sarsay, Taylor and Hinds
ATTORNEYS

Patented May 22, 1973

INVENTOR
TOM V. BURNS

BY Larson, Taylor and Hinds
ATTORNEYS

METHOD FOR MAKING AMMONIUM PHOSPHATE FERTILIZER

BACKGROUND OF THE INVENTION

This invention relates to methods and apparatus for producing phosphatic fertilizers by the direct ammoniation of phosphoric acid. More particularly, it relates to methods and apparatus for a continuous process of producing high concentrations of polyphosphate in ammonium phosphate fertilizers by the direct reaction of ammonia and wet-process phosphoric in a high temperature vaporous reaction whereby high concentrations of polyphosphates are formed.

It is well known that ammonium phosphate fertilizers may be produced by the reaction of ammonia and phosphoric acid to produce ammonium phosphate. Ammonia for use in such reactions is readily available in comparatively pure form. However, phosphoric acid is available in several grades with varying degrees of purity. Because of the economics involved, wet-process grade phosphoric acid is ordinarily used in the production of fertilizers since wet-process acid is much less expensive than the other grades.

Characteristically, wet-process orthophosphoric acid contains relatively large amounts of dissolved impurities such as calcium sulfates, fluorides and fluorosilicates, aluminum, magnesium, iron and other metals. In commercial 54 percent $P_2O_5$ acid, these impurities may comprise between about 1 and 10 weight percent. When such orthophosphoric acid is treated with ammonia to form either mono- or di-ammonium phosphate, or a mixture of both, the metallic impurities are precipitated. The iron and aluminum impurities are particularly troublesome as they form gelatinous precipitates which are substantially impossible to separate from the aqueous phase by ordinary methods. When iron and aluminum are present in amounts greater than about three percent, the entire aqueous phase often gells into a solid mass.

The precipitates ordinarily do not interfere with the phytonutritive value of ammonium phosphate. Conversely, they are considered to have fertilizing value of their own. However, they tend to settle to the bottom of the storage vessels and clog pipe lines and other equipment used for applying the liquid product to the soil. Because of the precipitates formed by the impurities, ammonium phosphate made from wet-process acid for fertilizer purposes is often manufactured, marketed and applied in the solid form. However, evaporating the aqueous material to produce a dry product together with packaging and otherwise handling the product may substantially increase the cost of ammonium phosphate fertilizers manufactured from wet-process acid.

It has been discovered that some of the impurities which are found in wet-process orthophosphoric can be maintained in fertilizer solutions by the introduction of colloidal clays or other materials which maintain the precipitate in solution or suspension. However the use of colloidal clays and the like is an expensive and involved process. It has also been discovered that reaction of ammonia with superphosphoric acid (phosphoric acid containing slightly more than 50 percent non-ortho forms of phosphoric acid such as pyro-, tetra-pyro, and tri-poly forms) yields a high percentage of polyphosphates. Polyphosphates, in high concentrations, tend to sequester or complex the impurities and suspend them in solution indefinitely. Polyphosphates also substantially increase the nutrient value of phosphatic fertilizers.

In ordinary ammoniation processes, ammonia is reacted with orthophosphoric acid at a temperature of approximately 150°F. Due to the kinetics involved, and the water contained in the acid, the major yield of the reaction is ammonium orthophosphate. Ordinarily only approximately 2 to 3 per cent of the $P_2O_5$ content of the acid is converted into polyphosphates. Since only a minor percentage of the $P_2O_5$ content of the acid is converted to polyphosphates, insufficient amounts of polyphosphates are present in the end product to effectively sequester or complex the impurity precipitates formed when wet-process acid is used.

Wet-process acid can be substantially concentrated to form super phosphoric by removal of water. However, such concentration techniques are expensive and burdensome.

Attempts have been made to increase the yield of polyphosphate by direct ammoniation of orthophosphoric at elevated temperatures. However, such attempts have been limited to the use of large vats for heating and agitating the acid. One of the main problems encountered in this process is the corrosiveness of phosphoric acid at elevated temperatures. In order to react large volumes of ammonia and acid, large vats must be used to heat and properly agitate the solution since severe agitation is required to prevent over-or under-ammoniation of the acid. During the heating and agitation process, large amounts of foam are generated which are difficult to control. Furthermore, the reaction vessels are subject to the severe corrosive effects of the hot phosphoric acid.

Other attempts have been made to react ammonia vapor and phosphoric acid at high temperature. However, such processes involve several inter-related process parameters and reaction conditions on which the yield of polyphosphate is heavily dependent.

It is an object of the present invention to provide a process for making ammonium phosphate directly from wet process phosphoric acid wherein at least 50 percent of the $P_2O_5$ content of the phosphoroc acid is converted to the non-ortho form. It is a further object to provide such a process which is free from the disadvantages heretofore associated with such processes.

BRIEF SUMMARY OF THE INVENTION

The foregoing and other objects of the invention which will be apparent to those skilled in the art are achieved by providing a method of preparing ammonium polyphosphates from impure wet process phosphoric acid having a $P_2O_5$ content of from about 58 to 68 percent by weight comprising introducing said phosphoric acid in a first direction into a mixing zone, introducing ammonia vapor in a second direction opposite to said first direction into said mixing zone to contact said acid at a velocity of at least 500 ft/second to mix said acid and ammonia, said ammonia being added in an amount of from 0.8 to 1.2 moles per mole of phosphoric acid, conveying said mixed acid and ammonia through a reaction zone maintained by exothermic heat generated by the reaction at a temperature of from 560° to 600° F for from 0.10 to 0.18 seconds to effect reaction between the acid and ammonia, the reaction product comprising a hot melt ammonium polyphosphate product, and substantially immediately quenching said hot melt to provide an ammonium polyphosphate product, at least 50 percent of the $P_2O_5$ content of the product being converted to the non-orthophosphate form. The process is preferably carried out in apparatus comprising a tee mixing chamber including first and second inlet arms disposed at 180° with respect to one another and an outlet arm set at about 90° with respect to said inlet arms, means for introducing ammonia into said mixing chamber through said first inlet arm of said tee, means for introducing impure wet process phosphoric acid into said mixing chamber through said second inlet arm of said tee, a reaction zone adjacent to said mixing tee comprising an elongate conduit loop having an inlet end adjacent to and in fluid communication with the outlet arm of said mixing tee, said loop being substantially U shaped and having an outlet end, means for maintaining the temperature of said reaction loop at a temperature of from 560° to 600°F, and a quench chamber containing water located adjacent to and in fluid communication with the outlet end of said reaction loop for quenching ammonium phosphate reaction product introduced thereto from said reaction loop.

DETAILED DESCRIPTION

There follows a detailed description of a preferred embodiment of the invention, together with accompanying drawings. However, it is to be understood that the detailed description and accompanying drawings are provided solely for the purpose of illustrating a preferred embodiment and that the invention is capable of numerous modifications and variations apparent to those skilled in the art without departing from the spirit and scope of the invention.

Figure 1:
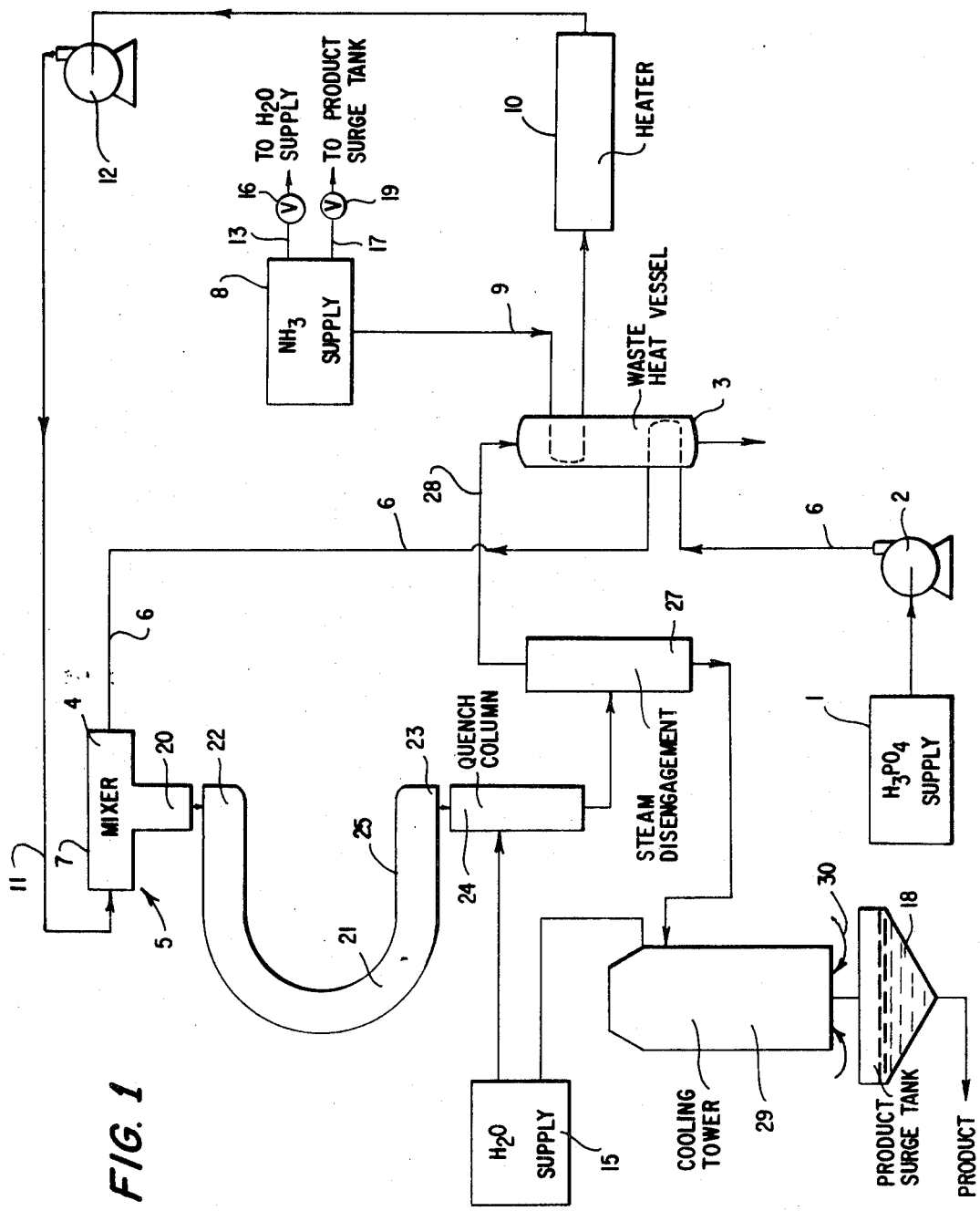
Figure 2:
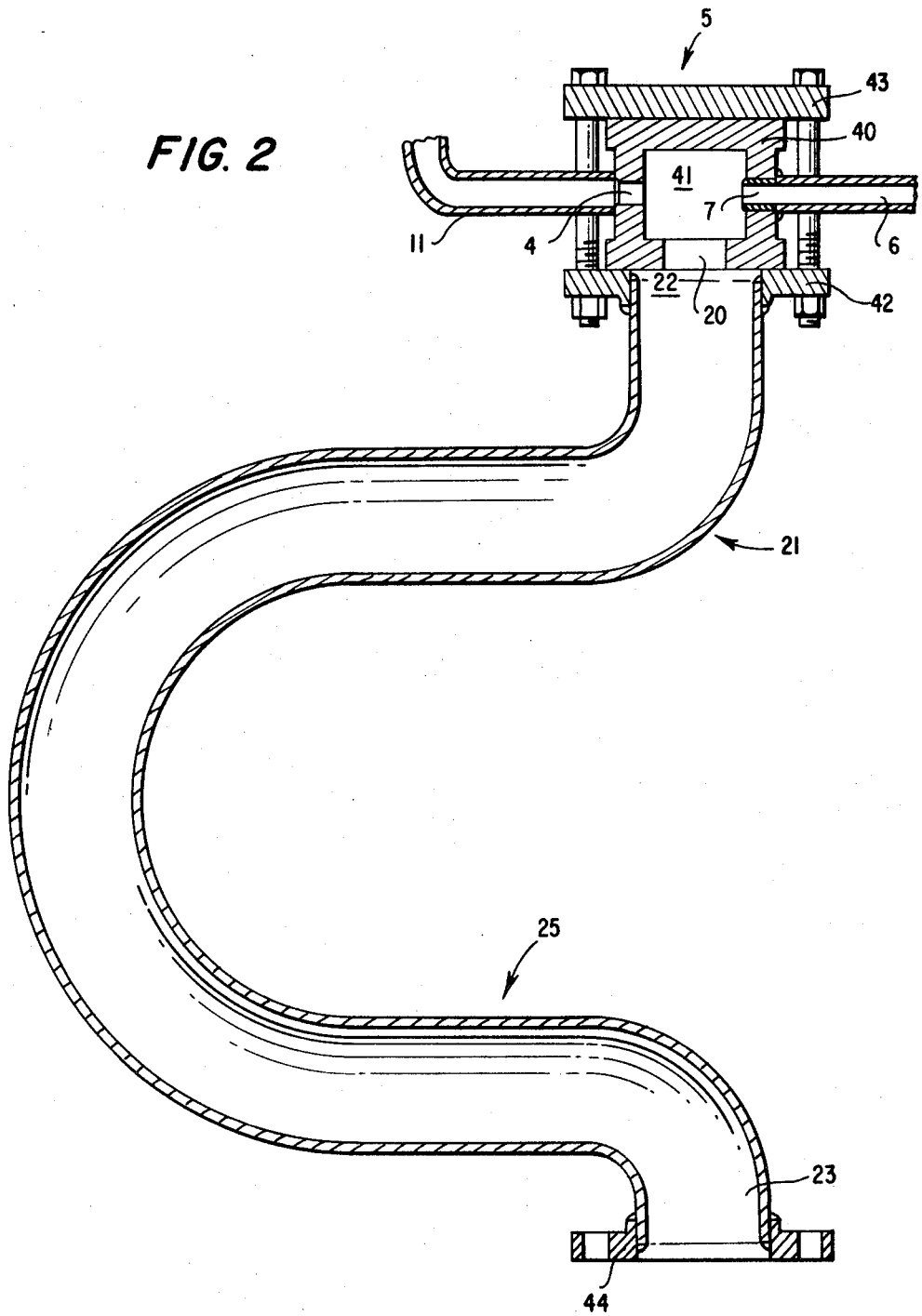

FIG. 1 is a diagrammatic flow sheet illustrating the method and apparatus according to the present invention; and FIG. 2 is a sectional view of a tee mixer and loop reaction chamber useful in the process and apparatus of FIG. 1.

Wet process phosphoric acid is provided in a tank 1 or other source of supply from where it is pumped by pump 2 through waste heat vessel 3 to a first inlet arm 4 of tee mixer 5. The wet process acid is preferably concentrated as necessary by evaporation to a $P_2O_5$ content of from about 58 to 68 percent, preferably about 59–61 percent, by weight. The acid is preferably heated to a temperature of about 200° to 220°F for introduction into mixing tee 5 at that temperature and this is preferably accomplished by using waste heat from the reaction with ammonia to be described below. Waste heat, in the form of steam, is introduced into the top of heat exchanger vessel 3 and the acid feed from supply 1 is pumped by pump 2 through conduit 6 a portion of which passes through vessel 3. Vessel 3 may be any conventional indirect heat exchanger. Evaporation of the raw wet process acid can be accomplished as required by conventional evaporators preferably utilizing vacuum.

Ammonia is introduced into mixing tee 5 through a second arm 7 arranged opposite arm 4 such that the ammonia and phosphoric acid are introduced into the mixing zone from opposite directions about 180° apart. The ammonia is preferably introduced at a temperature of from 600° to 700°F and is conveniently heated by passing ammonia from supply tank 8 through waste heat vessel 3 by means of conduit 9 where the ammonia is vaporized and heated to about 200° to 220°F. The ammonia is then heated further in heater 10, which is conveniently a fuel-fired heater, and is introduced into the mixing tee through conduit 11 at about 600° to 700°F.

In order to ensure thorough mixing, the acid and ammonia streams are introduced into the mixing zone from opposite directions and the ammonia is preferably introduced at a high velocity of preferably at least 500 feet per second. Still more preferably, the ammonia is introduced at substantially sonic velocity. While higher velocities can be used, the improvement in mixing is slight at best. Adequate mixing velocity is easily accomplished by pumping the ammonia into the tee under pressure by means of one or more pumps 12.

Ammonia supply tank 8 is also provided with supply conduit 13 for introducing ammonia into water supply tank 15 under the action of valve 16 and supply conduit 17 for introducing ammonia into product surge tank 18 under the action of valve 19 for purposes to be discussed hereinbelow.

The mixed acid and ammonia leaves the mixing tee through arm 20 set at an angle of about 90° with respect to arms 4 and 7 and is immediately introduced into loop reactor 21. Loop reactor 21 is an elongate, U-shaped conduit having its inlet end 22 adjacent to and in fluid communication with the outlet arm 20 of the mixing tee and having its outlet end 23 adjacent the inlet end of a quench column 24. The structure and arrangement of mixing tee 20 and loop reactor 21 constitute important aspects of the invention. It will be remembered that the primary object of the invention is to convert a substantial portion of the $P_2O_5$ in the acid to the polyphosphate, or non-orthophosphate form. In accordance with the present invention, it has been found that the residence time of the reaction at a temperature of from 560° to 600°F is extremely critical. Specifically, it has been found that residence time must be between 0.10 and 0.18 seconds at this temperature in order to convert a high percentage of $P_2O_5$ to the polyphosphate form. For example, utilizing a phosphoric acid having a $P_2O_5$ content of 60 percent and operating with a loop reactor residence time of 0.11 seconds according to the invention will yield a product with about 60 percent $P_2O_5$ conversion to polyphosphate. However, if the residence time falls below about 0.10 seconds or is increased above 0.18 seconds, the conversion rate falls off drastically.

The reaction is exothermic and the reactants are preheated as indicated to maintain the reaction at a temperature of 560°–600°F without adding or removing heat. However, the ratio of the reactants and their temperatures may be varied to accommodate variations in process conditions and the reactor is therefore preferably provided with conventional thermostatically controlled heat regulation means.

In order to ensure that residence time at the reaction temperature is not unduly increased, the mixing tee is sized such that the residence time of the mixed reactants in the mixing tee is not more than about 0.04 seconds, prior to being introduced into the reaction zone.

The ammonia is introduced into the mixing tee in an amount of from 0.8 to 1.2 moles per mole of $P_2O_5$.

The reaction zone is a curved, U-shaped, path provided by U-shaped conduit 25 forming loop reactor 21. The reaction product emerging from the outlet end 23 of the reactor comprises a mixture of steam, melt, and unreacted ammonia. The ratio of ammonia to $P_2O_5$ in the melt is at least 0.81.

The melt emerging from outlet 23 of reactor loop 21 is substantially immediately quenched with water in quench column 24. Column 24 is preferably a conventional packed column having a plurality of orifice plates to achieve high turbulence and a homogeneous product. Water is introduced to quench column 24 from supply tank 15 through conduit 26. Ammonia may be added to the water, if desired, to increase the amount of ammonia in the product or to adjust the pH thereof and conduit 13 and valve 16 are provided for this purpose.

During the quenching step, enough water is preferably added to form an 11-37-0 solution and to produce sufficient steam such that the product is cooled down to the boiling point of the 11-37-0 solution at atmospheric pressure. The quenched product is introduced into steam disengagement vessel 27 from which steam is removed as overheads through conduit 28 for use in waste heater 3. The steam-free product is then introduced into a conventional air cooling tower 29 through which air is drawn upwardly as indicated by arrows 30 by a blower (not shown). Cooled 11-37-0 solution passes from the bottom of cooling tower 29 into product surge tank 18 from which it is removed as product. Additional ammonia may be introduced into tank 18 from supply tank 8 through conduit 17 to adjust the pH or the ammonia content of the product.

The pH of the product is maintained between 5.95 and 6.1 by the addition of ammonia to the quench column, the surge tank, or both, as necessary. The pH of the product is also controlled, of course, by the initial ratio of reactants introduced into mixing tee 5.

Details of the mixing tee 5 and loop reactor 21 are shown in FIG. 2. Mixing tee 5 comprises a housing 40 enclosing a mixing chamber 41 having inlets 4 and 7 and outlet 20. Ammonia gas is introduced into chamber 41 through conduit 11. Phosphoric acid is introduced into chamber 41 through conduit 6.

Loop reactor 21 is coupled to mixing tee 5 by bolts extending through a first flange 42 welded to loop reactor tube 25 and a second flange 43 welded to the top of mixing tee 5. The inlet end 22 of loop reactor 21 of adjacent the outlet 20 of mixing tee 5 and it will be seen that the mixed reactants are substantially immediately introduced into the reactor loop. The outlet end 23 of loop reactor 21 is preferably welded to a flange 44 for coupling to the upper portion of quench column 24.

The invention is illustrated in the example which follows.

Wet phosphoric acid having the following composition:

| | |
|---|---|
| $P_2O_5$ | 60% |
| CaO | 0.06% |
| SO4 | 3.5% |
| F | 0.28% |
| Fe | 0.33% |
| Al | 0.18% |
| Mg | 0.45% |
| Free Water | 13.5% |
| S.G. at 60/60°F | 1.738 | is introduced into inlet 7 of mixing tee 5 at a temperature of about 210°F. Ammonia preheated to about 650°F is introduced into inlet 4 at a substantially sonic velocity and at a rate of about 1.0 mole per mole of $P_2O_5$ in he acid introduced. The temperature of the reaction zone during the reaction is 570°–585°F, and the residence time is 0.11 seconds. The reaction melt is quenched as indicated above and the product is 11-37-0 fertilizer having a pH of about 6.0. The product included 60 percent by weight of its $P_2O_5$ in the polyphosphate form. The product shows excellent self-sequestering properties and is very stable.

What is claimed is:

1. A method of preparing ammonium polyphosphates from impure wet process phosphoric acid having a $P_2O_5$ content of from about 58 to 68 percent by weight comprising:

introducing said phosphoric acid in a first direction into a mixing zone;

introducing ammonia vapor in a second direction opposite to said first direction into said mixing zone at a velocity of at least 500 ft/second to mix said acid and ammonia, said ammonia being added in an amount of from 0.8 to 1.2 moles per mole of phosphoric acid;

conveying said mixed acid and ammonia through a U-shaped conduit reaction zone maintained at a temperature of from 560° to 600°F for from 0.10 to 0.18 seconds to effect reaction between the acid and ammonia, the reaction product comprising a hot melt ammonia polyphosphate product; and substantially immediately quenching said hot melt to provide an ammonium polyphosphate product, at least 50 percent of the $P_2O_5$ content of the product being in the non-orthophosphate form.

2. A method according to claim 1 wherein said mixing zone is provided in a mixing tee, the ammonia being introduced through a first arm of the tee, the phosphoric acid being introduced through a second arm disposed at 180° with respect to the first arm and the mixture being withdrawn through a third arm disposed at 90° with respect to said first and second arms.

3. A method according to claim 1 wherein the residence time of the mixed reactants in said mixing tee is not more than about 0.04 seconds before introduction into said reaction zone.

4. A method according to claim 1 wherein the ammonia is introduced into the mixing zone at approximately sonic velocity.

5. A method according to claim 1 wherein the acid is introduced into said reaction zone at a temperature of about 200° to 220°F.

6. A method according to claim 1 wherein the ammonia is introduced into said mixing zone at a temperature of 600° to 700°F.

7. A method according to claim 1 wherein the hot melt is quenched by introducing the hot melt withdrawn from said reaction zone substantially immediately into an aqueous solution to form a liquid fertilizer solution.

8. A method according to claim 7 wherein said liquid fertilizer solution is about 11-37-0.

* * * * *